United States Patent Office 3,357,723
Patented Dec. 12, 1967

3,357,723
BALL-AND-SOCKET PIPE JOINTS, AND
APPLICATIONS THEREOF
Louis Dumont and Alphonse Pierre Lacombe, Toulouse,
France, assignors to Sud-Aviation Societe Nationale
de Constructions Aeronautiques, Paris, France
Filed June 22, 1965, Ser. No. 466,010
Claims priority, application France, June 26, 1964,
979,787, Patent 1,407,838
3 Claims. (Cl. 285—263)

ABSTRACT OF THE DISCLOSURE

A ball-and-socket joint between two pipe sections, comprising a first metal end-piece rigidly connected to one of the pipe sections and having a projection cup formed with two respectively internal and external concentric surfaces, on which are slidable two independent metal parts, one of which is internal and bears elastically against the corresponding spherical surface and is centered upon a second metal end-piece rigid with the other pipe section and forming a leaktight seal, the other metal part being external and rigidly connected in any suitable manner to said second end-piece to operate as a retaining element, the two metal parts respectively having on their spherical surfaces bearing against said cup at least one annular groove which, jointly with said cup and said second end-piece, bound a plurality of successive expansion chambers.

---

Figure 1:
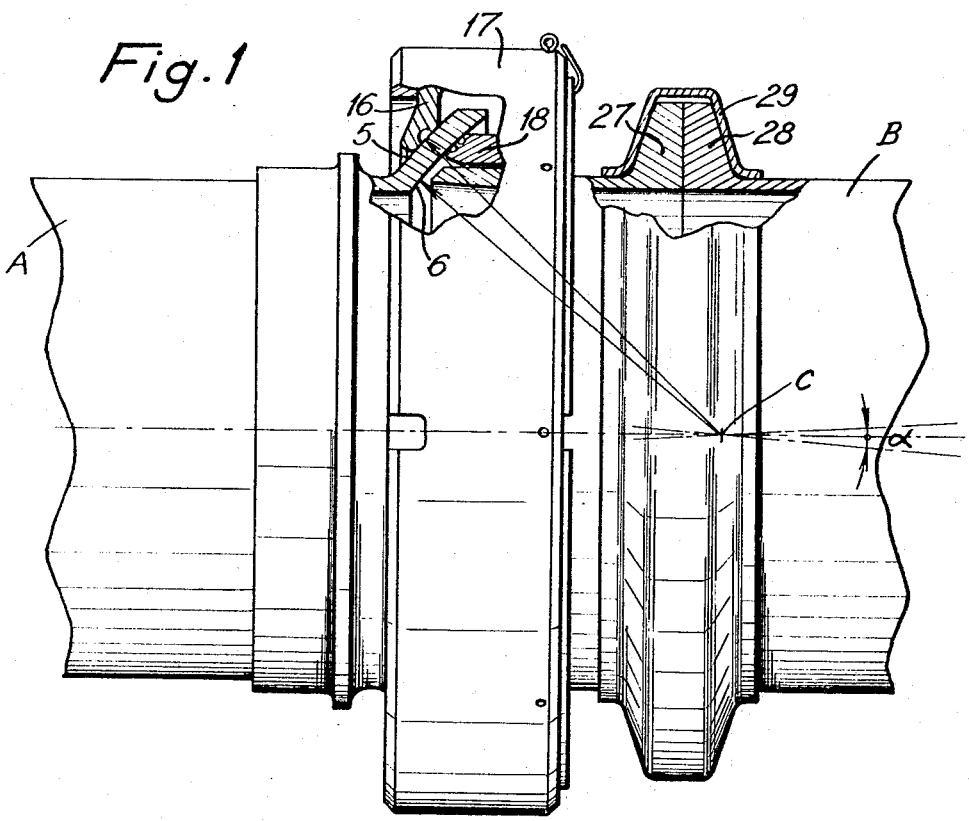

This invention relates to devices for interconnecting two pipe sections and for permitting angular movement of one of the sections relatively to the other.

In the engineering art such interconnecting devices have heretofore been provided by the use either of a deformable elastic joint the leaktightness of which is enhanced by a setting under pressure, or a ball-and-socket joint rigid with one of the pipe sections and comprising a part having a spherical surface adapted to move angularly in a part made of flexible material (usually natural or synthetic rubber) integral with a member mounted on the other pipe section. In either case the degree of leaktightness is dependent upon the elastic member in the joint, and when the pipe sections are liable to move often relatively to each other, the joint no longer remains leaktight after it has been in use for a relatively short time. The onset of this leaktightness defect will be all the more rapid if the fluid which is to flow through the piping is a hot fluid, due to deterioration of the elastic member under the effect of the heat.

The present invention has for its object to overcome these defects and ensure satisfactory leaktightness at the joint between two pipe sections adapted to move angularly with respect to each other, and to accordingly provide a ball-and-socket joint between pipe sections, comprising a first metal end-piece rigidly connected to one of the pipe sections and formed with a projecting cup having concentric inner and an outer spherical surfaces over which are slidable two independent metal parts, of which one is an internal part which bears elastically against the corresponding spherical surface and is centrally located upon a second metal end-piece rigidly connected to the other pipe section whereby to form a leaktight joint, and of which the other is rigidly connected in any convenient manner to said second end-piece whereby to serve as a restraining member, each of said two parts having formed on its spherical surface bearing against said cup one or more annular grooves which bound jointly with said cup and said second end-piece a plurality of successive expansion chambers. Preferably, the parts bearing against the internal and external spherical surfaces of the cup are made of a metal which is softer than the metal used for the first end-piece.

The invention further encompasses industrial applications of the ball-and-socket pipe joint hereinbefore disclosed, more particularly for piping through which flows hot pressurized air, and most notably for the pipes equipping air intake manifolds for starting jet engines.

The description which follows with reference to the accompanying non-limitative exemplary drawings will give a clear understanding of how the invention can be carried into practice.

Figure 2:
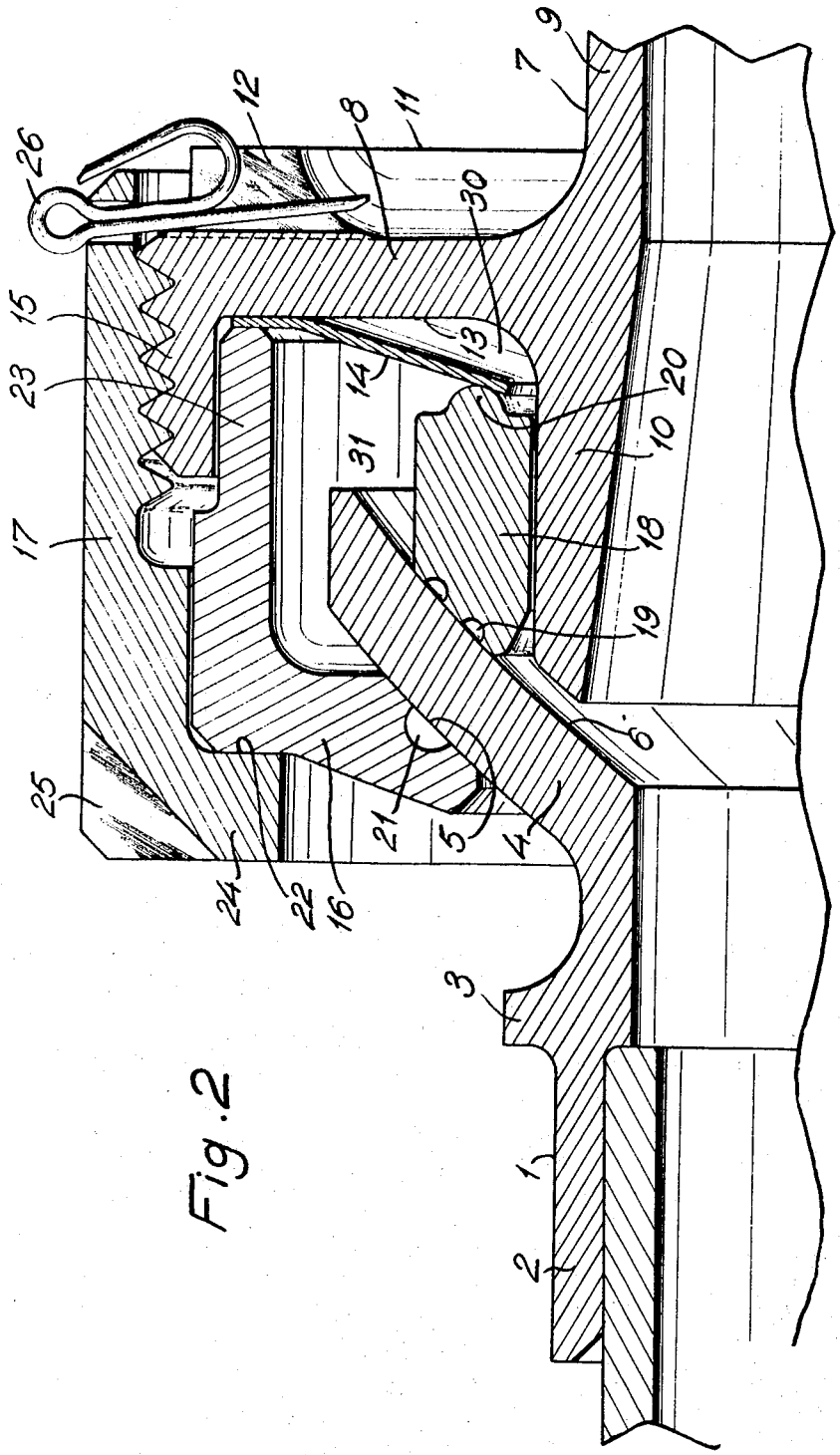

In the drawings,

FIG. 1 is an external view with partial cutaway of a length of piping the two sections of which have been interconnected by means of a ball-and-socket joint according to the invention; and FIG. 2 is a diametrical half sectional view on an enlarged scale of the ball-and-socket joint of FIG. 1.

The ball-and-socket joint illustrated in the accompanying drawings is used for interconnecting a pipe section A and a pipe section B (see FIG. 1). Reference to FIG. 2 shows that this joint comprises a metal end-piece 1 formed with a spherical cup embodying a spigot 2 which is secured over the pipe section A, a reinforcing rib 3 for resisting any distorting effects set up in the joint, and a spherical cup 4. The two spherical surfaces 5 and 6 of this cup are concentric with a common center C (see FIG. 1) and are protected by a hard chromium plating which makes the cup non-deformable.

The end-piece 1 with its spherical cup cooperates with a metal end-piece 7 (see FIG. 2) embodying a threaded flange 8 formed with a spigot 9 for securing the pipe section B and an inwardly projecting lip 10. The flange 8, of which the outer face 11 has projections 12 thereon and the inner face 13 serves as an abutment for a spring washer 14, is formed with an outer lip 15 of which the inner smooth surface acts as centering means for a metal cap 16 and the outer threaded surface enables an assembling nut 17 to be screwed thereon.

A leaktight seal 18 constituting an internal metallic abutment comprises a spherical surface formed with two semicircular grooves 19 and is in contact with the spherical surface 6 of the spherical cup 4 of end-piece 1. Contact between this seal and the spring washer 14 is ensured by means of a circular bead 20 formed on the seal.

The cap 16 is formed with a spherical bearing surface and a cylindrical flange. This cap acts as an external abutment and comprises a spherical surface which embodies semicircular groove 21 thereon and which is in contact with the spherical surface 5 of the cup 4 of end-piece 1, an annular surface 22 for restraining the nut 17, and a lip 23 for centering the cap inside the outer lip 15 of end-piece 7 and for retaining the spring washer 14.

The assembling nut 17 is formed with a heel 24 which bears against the annular surface 22 of cap 16, and with a threaded portion which screws onto the end-piece 7. On its end remote from the screw-thread, the nut 17 is provided with projections 25 to enable it to be tightened.

A pin 26 locks the assembling nut 17 after it has been screwed onto the end-piece 7.

The spigots 2 and 9 can be secured onto the corresponding pipe sections in any convenient known manner. As FIG. 1 shows by way of example, the spigot 2 may be engaged over the pipe section A and rigidly secured thereto by a continuous electrical weld, while the spigot 9 may terminate in a flange 27 which is rigidly connected in the conventional manner to a flange 28 of pipe secton B by means of a clamp 29.

The protective hard chromium plating on the spherical surfaces of the cup 4 ensures very great contact hardness between these surfaces, the seal 18 and the cap 16.

In the course of the relative angular movements of the two pipe sections, the inner lip 10 of end-piece 7 provides the desirable transition blends between the passageway sections through the ball-and-socket joint and temporarily positions the seal 18 until assembling is complete.

The spring washer 14 provides a degree of thrust compatible with the relative movement between pipe sections A and B and keeps the parts 18, 1 and 16 in mutual contact.

The end-pieces 1 and 7 as well as the assembling nut 17 are preferably made of a metal harder than the metal used for the seal 18 and the cap 16, this last-mentioned metal being regarded as a soft metal in comparison with the other metal.

Preferably, both end-pieces and the assembling nut are made of stainless steel, while the cap 16 and the seal 18 are made of a nickel-copper alloy, a particularly suitable example being the Monel 400 metal. A ball-and-socket joint of this type is particularly well suited for interconnecting two pipe sections through which hot pressurized air flows, the Monel metal having an extremely low coefficient of expansion and very high resistance to corrosion. This type of joint may be used for the air intake manifolds required for starting jet engines.

A joint as hereinbefore described will allow the pipe sections it interconnects to absorb relative angular deflections α (see FIG. 1) occurring for various reasons, an example being the deformations and elongations due to the fluctuating expansion resulting from variations in the temperature of the air flowing through the piping.

Indeed any angular deflection of the pipe section B will cause the parts 16 and 18 to slide along the outer and inner spherical surfaces 5 and 6 of the spherical cup 4 of end-piece 1, with the nut 17 following the motion of the cap 16 and the end-piece 7. The spring washer 14 will provide a degree of thrust compatible with the relative motions. Compression of this spring when the joint is assembled generates permanent constant-pressure contacts between the parts 14, 18, 1 and 16.

The sealing areas formed by surfaces in contact, with or without mutual slip, include principal sealing areas provided by the surfaces of the cap 16 and the seal 18 in contact with the spherical surfaces 5 and 6 of the cup 4 of end-piece 1, and by the contact existing between the spring washer 14, the flange 8 of end-piece 7 and the cap 16. These latter contacts are made permanent when the nut 17 is screwed home onto the end-piece 7 and bears hard against the cap 16, the pressure depending on the tightening torque applied to the nut 17. Additional secondary sealing areas are provided by the contact between spring washer 14 and the circular bead 20 of seal 18, and between the latter and the inner lip 10 of end-piece 7. The limited clearance between the two last-mentioned parts allows for expansion and prevents any seizure that could neutralize the effect of the spring washer 14.

In cases where the ball-and-socket joint disclosed hereinabove is applied to piping through which pressurized air flows, any air attempting to escape after passing through the spherical ring formed between the flange 4 of end-piece 1 and the end-piece 7 must cross three successive expansion zones. The first zone is formed by the two annular grooves 19 of semicircular profile formed on the spherical surface of seal 18 adapted to slide over the spherical surface 6 of flange 4, and by the space which exists between the seal and the inner lip 10 of end-piece 7 and which leads into an annular chamber 30 of relatively small volume bounded by the seal 18, the spring washer 14 and the flanges 8 of end-piece 7. The second expansion zone comprises a main expansion chamber 31 of large volume bounded by the flange 4 of end-piece 1, the cap 16, the spring washer 14 and seal 18. The third expansion zone consists of the annular groove 21 of semicircular profile formed on the spherical surface of cap 16 adapted to slide over the outer spherical surface 5 of flange 4. This single groove has proved to be adequate to stop such air leaks, the air having already been considerably expanded in the chamber 31.

The subject ball-and-socket joint of the invention can be adapted to all pipe diameters. The size required for its various component parts will depend on the amplitude of the deflections that the assembly must be capable of withstanding and, where the joint is used for piping through which hot air under pressure is to flow, on the pressure and temperature of the air.

What we claim is:

1. A ball-and-socket joint between first and second pipe sections used for transmitting pressurized fluid, comprising, in combination, a first metal end-piece rigid with the first of said pipe sections, a projecting cup rigid with said first end-piece and having concentric inner and outer spherical surfaces, a second metal cylindrical end-piece having an axis of revolution and rigidly connected to said second pipe section, said spherical surfaces having a center lying on said axis of revolution, an external annular metal part, means rigidly clamping said external metal part to said second end piece, said external metal part having a spherical surface in contact with the outer spherical surface of said cup, an internal annular metal part slidably encircling said second end-piece having a spherical surface in contact with the inner spherical surface of said cup and further having a bearing surface for axial sliding on said second end-piece, and an annular spring means rigidly retained at the outer periphery thereof between said second end-piece and said external annular metal part by the action of said clamping means, said spring means bearing freely against said internal annular metal part, whereby said internal annular metal part is urged axially towards said inner spherical surface of said cup so as to force the spherical surface of said internal annular metal part against the inner spherical surface of said cup, and thereby to force the outer spherical surface of said cup against the spherical surface of the external metal part.

2. A ball-and-socket joint as claimed in claim 1, wherein said spring means is a spring washer having an outer edge clamped between said second end-piece and said external annular metal part and an inner edge bearing freely against said internal annular metal part.

3. A ball-and-socket joint as claimed in claim 2, wherein said clamping means comprises an externally threaded flange rigid with said second end-piece and having an inner surface for receiving said external annular part, an assembly nut on said flange and including a collar bearing on said external annular part to tighten the same against said spring washer bearing on said second end-piece.

References Cited

UNITED STATES PATENTS

| 781,862 | 2/1905 | Allen | 285—262 X |
| 866,061 | 9/1907 | Phillips | 285—262 X |
| 1,510,755 | 10/1924 | Weir et al. | 285—267 X |
| 1,580,462 | 4/1926 | Woodruff | 285—267 |
| 1,906,575 | 5/1933 | Goeriz | 285—270 |
| 2,511,158 | 6/1950 | Gray | 285—234 X |
| 2,846,242 | 8/1958 | Drake | 285—263 |
| 3,273,917 | 9/1966 | Chakroff | 285—263 |

FOREIGN PATENTS

| 968,434 | 2/1958 | Germany. |

CARL W. TOMLIN, *Primary Examiner.*

R. G. BERKLEY, *Assistant Examiner.*